United States Patent [19]

Spiegelberg et al.

[11] Patent Number: 5,217,158
[45] Date of Patent: Jun. 8, 1993

[54] PROCESS FOR THERMODYNAMICALLY TREATING A REGION JOINING TWO MEMBERS

[75] Inventors: William D. Spiegelberg, Parma; John O. Ratka, Cleveland Heights; Clarence S. Lorenz, Lakewood, all of Ohio

[73] Assignee: Brush Wellman, Inc., Cleveland, Ohio

[21] Appl. No.: 914,204

[22] Filed: Jul. 14, 1992

[51] Int. Cl.$^5$ .............................................. B23K 31/02
[52] U.S. Cl. .................... 228/231; 148/516; 148/521; 148/665; 228/263.18
[58] Field of Search ............. 228/231, 263.18, 263.11, 228/239; 148/516, 521, 519, 665, 527

[56] References Cited

U.S. PATENT DOCUMENTS

| 3,865,639 | 2/1975 | Bellot et al. | 148/521 |
| 3,997,374 | 12/1976 | Dill et al. | 148/521 X |
| 4,975,128 | 12/1990 | Schmitz | 148/521 X |

FOREIGN PATENT DOCUMENTS

| 62-133050 | 6/1987 | Japan | 148/658 |
| 615141 | 7/1978 | U.S.S.R. | 148/521 |

OTHER PUBLICATIONS

Metals Handbook 9th Ed., vol. 4 "Heat Treating", pp. 728-734.

Primary Examiner—Richard K. Seidel
Assistant Examiner—Jeanne M. Elpel
Attorney, Agent, or Firm—Hopgood, Calimafde, Kalil, Blaustein & Judlowe

[57] ABSTRACT

This invention relates to a process for thermodynamically treating a region joining two members. In accordance with one aspect of the present invention, are the steps of heating the region to a first temperature generally within a range of 750° F. and 850° F. so as to diffuse a strengthening material in the region into a heat affected zone between the members; maintaining the first temperature for a first selected time within a range of 3 to 20 hours so as to raise the percentage of strengthening material diffusing into the heat affected zone; heating the region to a second temperature generally within a range of 900° F. to 1000° F. so as to initiate hardening of the heat affected zone; maintaining the second temperature for a second selected time generally within a range of 0.5 to 5 hours so as to harden the heat affected zone with minimal decrease in hardening of regions outside the heat affected zone; and cooling the region to room temperature. This invention also relates to a composition of a region joining two members treated thermodynamically by a process set forth by the present invention. In accordance with one aspect of the present invention, there is provided a region comprising a solidified bead containing generally between 1.6 and 2.0% beryllium, a melt and mix zone containing generally between 0.6 and 1.8% beryllium, a recrystallized zone containing generally between 0.6 and 1.0% beryllium, and an overaged zone containing generally between 0.3 and 0.8% beryllium.

10 Claims, 7 Drawing Sheets

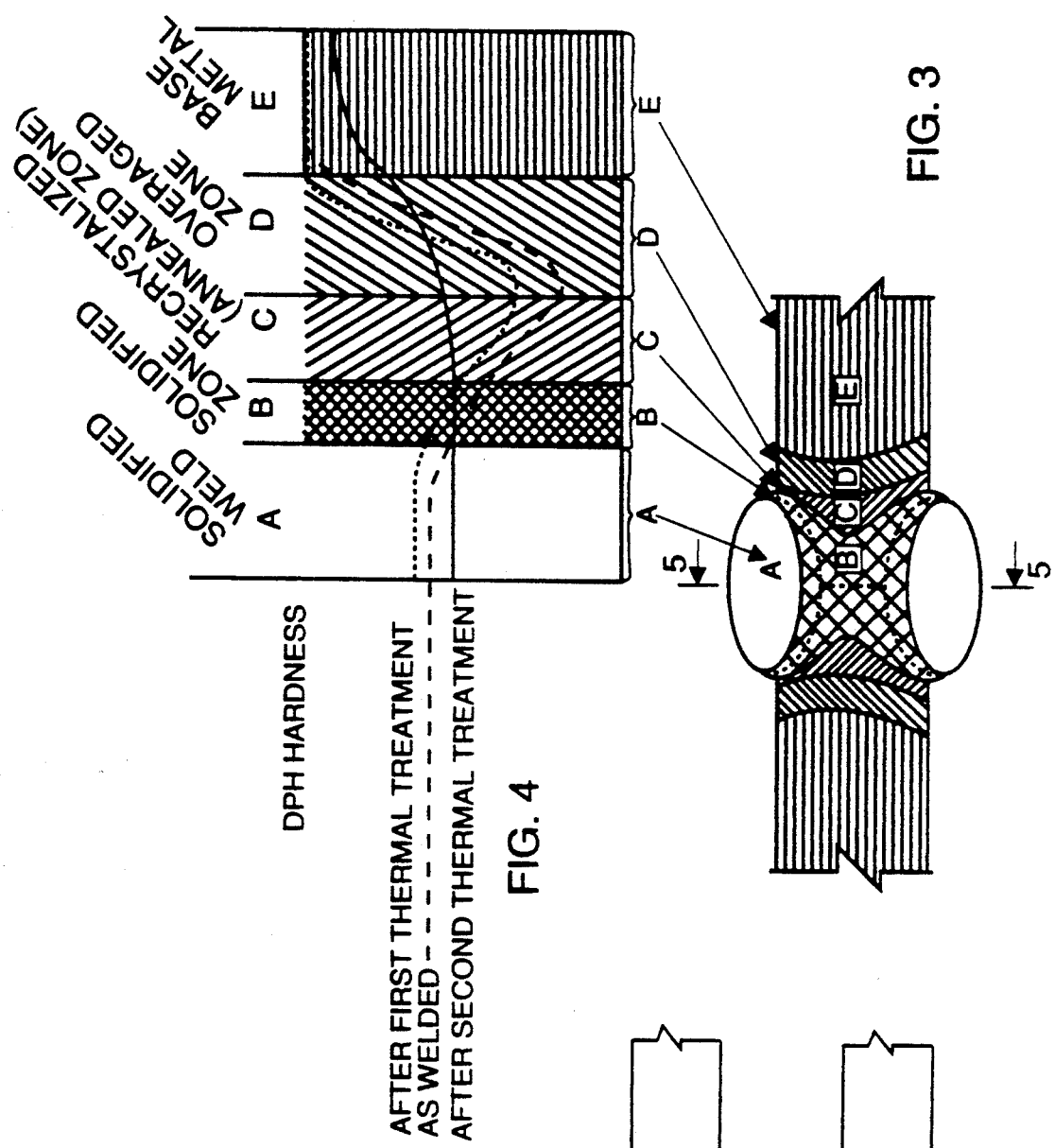

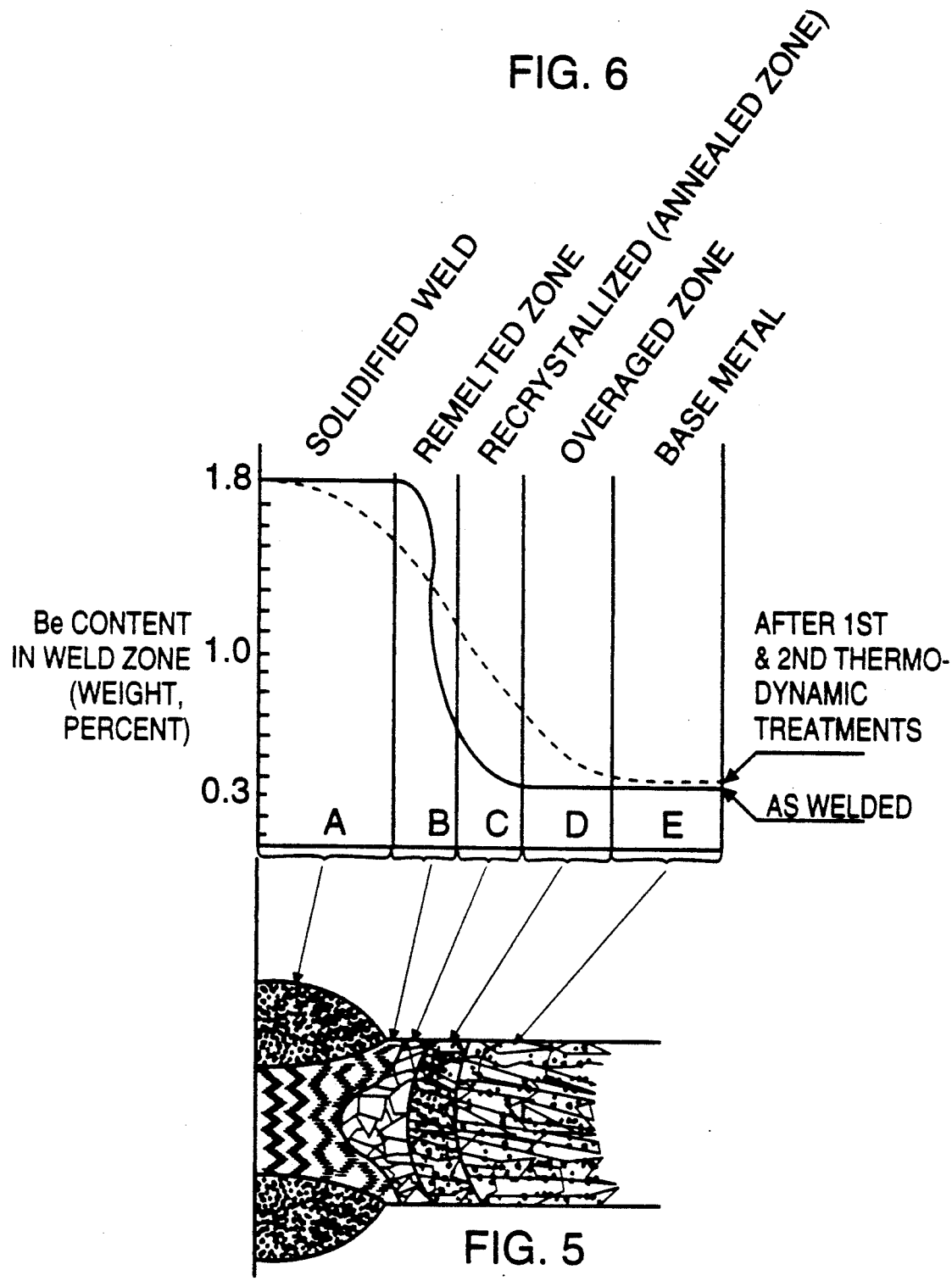

PROCESS FOR THERMODYNAMICALLY TREATING A REGION JOINING TWO MEMBERS

BACKGROUND OF THE INVENTION

The present invention relates to processes for joining precipitation hardenable materials and more particularly to a process for treating a welded region so as to increase its strength and conductivity.

Joining structures to one another, and particularly metal parts, is commonly accomplished by welding. For instance, two parts of a base metal are placed in contact. The respective portions to be joined are shaped suitably to form a selected configuration upon joining, i.e., a double U-shape or double V-shape joint. Weld filler material is then deposited and melted at the joint. Typically, the composition of weld filler material is matched to that of the base metal. Once the region between the parts has cooled, the parts are fused together.

While the filler material fused the base metal parts to one another, the process used to join them often resulted in a joining region weaker than the parts themselves. This not only limited the structural designs that could be built, but also the environments to which the parts could be subjected.

SUMMARY OF THE INVENTION

In accordance with one aspect of the present invention, there is provided a process for thermodynamically treating a region joining two members. The process comprises the steps of (i) heating the region to a first temperature generally within a range of 750°–850° F. so as to diffuse a strengthening material from the region into a heat affected zone between the members, (ii) maintaining the first temperature for a first selected time to raise the percentage of strengthening material diffusing into the heat affected zone, (iii) heating the region to a second temperature generally within a range of 900°–1000° F. to initiate hardening of the heat affected zone, (iv) maintaining the second temperature for a second selected time to harden the heat affected zone with minimal decrease in hardening of the region outside the heat affected zone and (v) cooling the region to room temperature.

The present invention is further directed to a thermodynamically treated region joining two members, the region comprising a solidified bead containing generally between 1.6 and 2.0% beryllium, a melt and mix zone containing generally between 0.6 and 1.8% beryllium, a recrystallized zone containing generally between 0.6 and 1.0% beryllium, and an overaged zone containing generally between 0.3 and 0.8% beryllium.

Although the present invention is shown and described in connection with a copper alloy which includes beryllium, it may be adapted for strengthening welds of other conventional compositions such as those of silicon, nickel, aluminum, titanium and steel.

Accordingly, it is an object of the present invention to harden a region joining two members without sacrificing the hardness characteristics of adjacent regions.

Another object of the present invention is to provide for the simple and efficient manufacture of metal parts with minimum manual labor requirements.

Still another object of the present invention is to age a region joining two members, particularly the heat affected zone, to maximize the mechanical properties of the region.

Still a further object of the present invention is to minimize fusion defects in the joining region.

The present invention will now be further described by reference to the following drawings which are not intended to limit the accompanying claims.

BRIEF DESCRIPTION OF THE DRAWINGS

FIG. 2a is a diagrammatic representation of a double-U shaped joint configuration before welding;

FIG. 2b is a diagrammatic representation of a double-V shaped joint configuration before welding;

FIG. 3 is a diagrammatic representation of a double-U shaped joint configuration after first and second thermodynamic treatments;

FIG. 4 is a graph generally representative of Hardness DPH vs. length of weld for the joint configuration of FIG. 3 after first and second thermodynamic treatments;

FIG. 5 is a sectional view taken along line 5—5 of FIG. 3. It represents a micrograph of the joint configuration after first and second thermodynamic treatments;

FIG. 6 is a graph of Beryllium content in the weld zone vs. length of weld after first and second thermodynamic treatments;

The same numerals are used throughout the figure drawings to designate similar elements. Still other objects and advantages of the present invention will become apparent from the following description of the preferred embodiments.

DETAILED DESCRIPTION OF THE PREFERRED EMBODIMENTS

Precipitation hardenable materials of relatively high strength and conductivity, e.g., beryllium-copper alloys, have been found desirable for use in continuous conductors, including toroidal field coils typically utilized in plasma fusion systems. The size of such systems necessitates that large plates which comprise these conductors be joined metallurgically so as to accommodate selected system dimensions. Given the generally harsh environment of fusion systems, welds of relatively high strength and conductivity are sought to maintain structural integrity and operation of the conductor.

Preferably, the toroidal field coils are manufactured by welding together large plates of beryllium-copper alloy, e.g., Alloy 3 HT (C17510), using a filler metal of beryllium-copper alloy, e.g., Alloy 25 (C17200). Such precipitation hardenable materials are preferably joined using gas tungsten arc welding (GTAW), gas metal arc welding (GMAW) or a combination thereof. It is understood, however, by those skilled in the art that any process or means can be utilized for joining large plates, giving consideration to the purpose for which the present invention is intended.

The foregoing discussion is provided for purposes of illustration and is not intended to limit the intended environment. The remaining structural and functional aspects of plasma systems are known by those skilled in the art and further description is believed unnecessary for illustration of the present invention.

Figure 1:
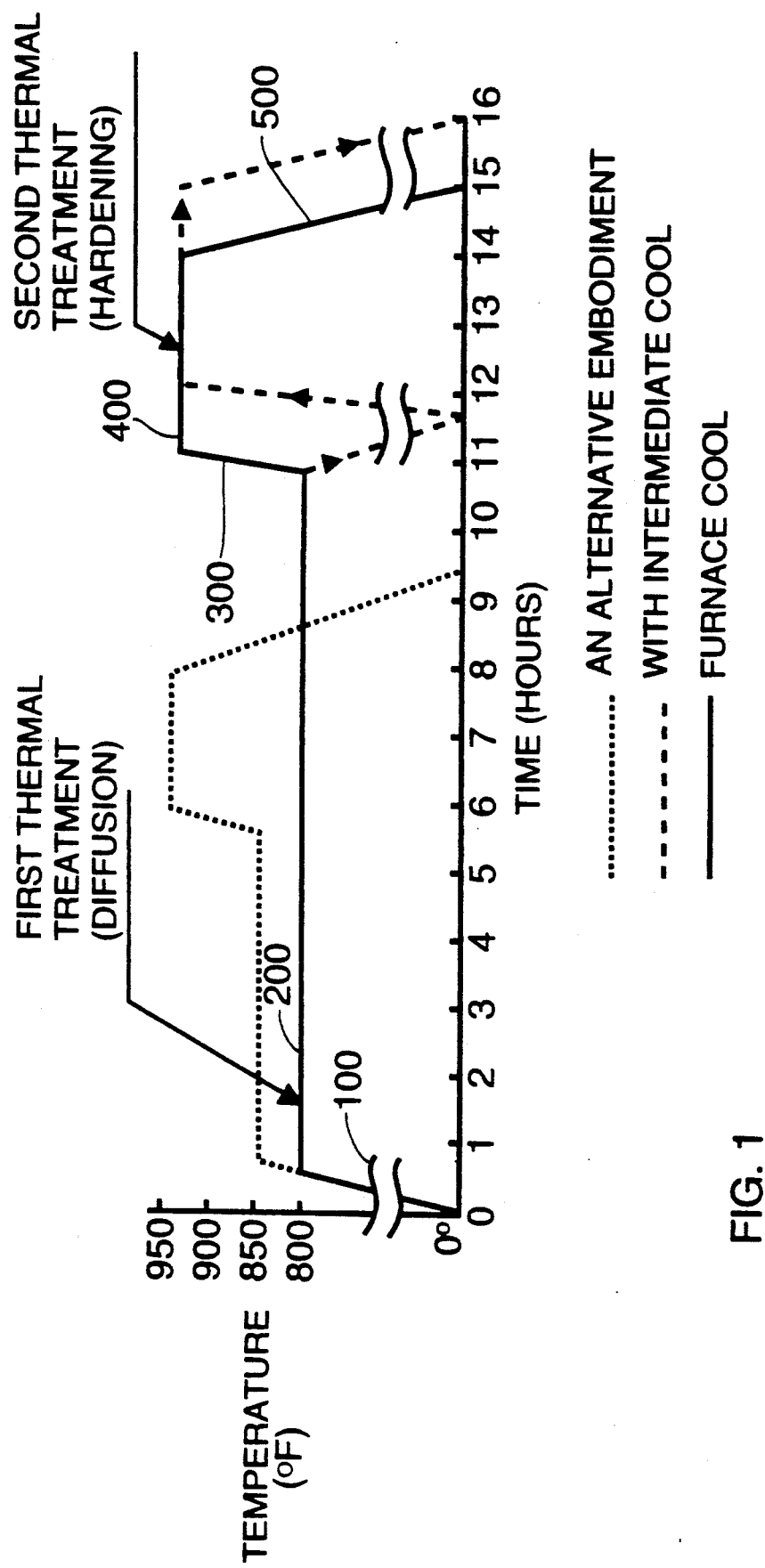
FIG. 1 is a graph which illustrates temperature as a function of time in accordance with various aspects of the present invention.

In accordance with one aspect of the present invention, FIG. 1 graphically illustrates a process for thermodynamically treating a region joining two copper alloy members, each alloy including beryllium. The region is adjacent to and influenced by heat associated with formation of a weld. The process comprises the steps of (i) heating the region to a first selected temperature to diffuse a strengthening material, e.g., beryllium, from the region into a heat affected zone between the members, (ii) maintaining the first temperature for a first selected time to raise the percentage of strengthening material diffusing into the heat affected zone, (iii) heating the region to a second temperature to initiate hardening of the heat affected zone, (iv) maintaining the second temperature for a second selected time to harden the heat affected zone with minimal decrease in hardening of the region outside the heat affected zone and (v) cooling the region to room temperature. The heat affected zone refers generally to those zones labeled (B), (C) and (D), as best shown in FIGS. 3 and 5.

More particularly, this process is divided into first and second thermodynamic treatments for improving strength and conductivity of the joining region. During the first step (100) of the first thermodynamic treatment, the joining region is heated to a first selected temperature generally within a range of 750°-850° F. This causes the strengthening material, beryllium, in the region to begin diffusing into a heat affected zone between the constituent members of a welded composite. The first step is represented by a relatively steep, positively sloped solid line shown in FIG. 1. Preferably, during this step, the first temperature is held constant at a selected temperature within the disclosed range, e.g., about 800° F.

During the next or second step (200), the first temperature is maintained for a first selected time generally within a range of 3 to 20 hours so as to raise the percentage of strengthening material diffusing into the heat affected zone. This step is represented by a generally horizontal line. It has been found that a first selected time of approximately 10 hours is suitable for diffusing beryllium into the heat affected zone between the beryllium-copper alloy (C17510) plates of the present embodiment. It is understood, however, by those skilled in the art that the suitable duration of diffusion will vary, as shown in FIG. 1, depending on furnace conditions, raw materials and the like.

During the third step (300), the second thermodynamic treatment begins. The joining region is heated to a second temperature generally within a range of 900°-1000° F. to initiate hardening of the heat affected zone. It is preferred that the second temperature be held constant at a second selected temperature within the disclosed range, e.g., about 950° F.

The second temperature is then maintained, during a fourth step (400), for a second selected time generally within a range of 0.5 to 5 hours, e.g., approximately 3 hours. Step (400) effects hardening of the heat affected zone to a desired level with minimal decrease in hardening of the region outside the heat affected zone. Strength reduction outside the heat affected zone is also insignificant.

Finally, the region is cooled to room temperature during a fifth step (500). While cooling may be achieved by any suitable process, the plates are preferably air cooled by free convection. A recirculating air or atmosphere type furnace is preferably used to maintain the temperature relatively uniform throughout the furnace during the process of the present invention. The temperature is monitored continuously, e.g., by computer, to insure uniformity.

EXAMPLE 1

A variety of tests have been conducted using the present process. For example, large plates (1.1" thick, 6" wide and 24" long) of Brush Hycon 3 ™, a high performance beryllium-copper alloy (C17510), were welded by GMAW techniques at a double-U shaped joint configuration (see FIG. 2a). The plates were initially hardened to 252 DPH. During the first thermodynamic treatment, a temperature of 850° F. was maintained for 5 hours. During the second thermodynamic treatment, a temperature of 950° F. was maintained for 2 hours. Weld hardness after the first and second thermal treatments is generally illustrated by experimental data in FIG. 12, specifically the dotted lines.

For purposes of illustration only, a double U-shaped joint configuration is shown in FIG. 2a. It is understood, however, that any configuration, for example, a double V-shaped joint as shown in FIG. 2b, could be utilized giving consideration to the purpose of the present invention.

In an alternative embodiment, the first and second thermodynamic treatments are reversed. During the first step of the first thermodynamic treatment, the joining region is heated to a first selected temperature generally within a range of 900°-1000° F. The first temperature is maintained for a first selected time generally within a range of 0.5 to 5 hours. This initiates diffusion and hardening of the heat affected zone.

Next, the joining region is heated (or cooled) to a second selected temperature generally within a range of 750°-850° F. Diffusion of the strengthening material, beryllium, into the heat affected zone continues during this step. The second temperature is held constant for a second selected time generally within a range of 3 to 20 hours in order to increase the percentage of strengthening material diffusing into the heat affected zone.

Although the present invention is shown and described for use with plasma fusion systems, its adaptability for other uses will be appreciated by those skilled in the art. For example, the present invention may be used in the manufacture of welded tubular products such as pipes and storage containers as well as superconducting and resistance type magnets.

Figure 7:
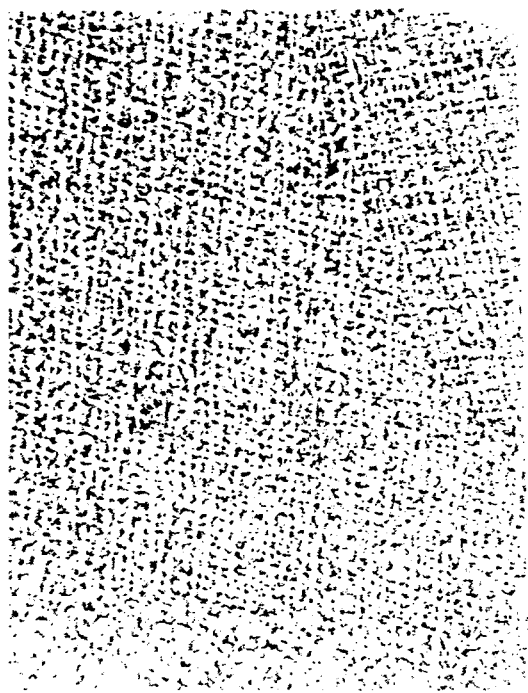
FIGS. 7–11 are micrographs of a beryllium-copper alloy at 200× magnification of zones (A)–(E), respectively, of FIGS. 5 and 6.

Referring now to FIGS. 2-6, the thermodynamically treated region joining the two members is comprised of zones with varying beryllium content (by weight percent). The first zone or solidified bead (A) contains generally between 1.6 and 2.0% beryllium. As shown graphically in FIG. 6, the beryllium content of the weld zone is relatively constant, being on the order of 1.8%, as measured from the center of the bead to its outer perimeter. After the first thermodynamic treatment, the beryllium content remains relatively unchanged. However, after the second thermodynamic treatment, the weight percent of beryllium gradually decreases from the bead center to its outer perimeter, this decrease being represented generally by a negatively sloped line. The metal alloy microstructure, as shown in FIGS. 5 and 7, indicates that solidification of this zone takes place at a relatively slow rate.

Below the solidified bead and joining the two members is a relatively wishbone-shaped melt and mix zone (B). Zone (B) comprises a region immediately adjacent the base metal which becomes molten and mixed (by convective action) with the molten superheated filler metal deposited at the joint. The resulting zone of mixed metal composition contains generally between 0.6 and 1.8% beryllium. The content of the beryllium hardening element in this zone is generally higher than that of the base metal, but lower than that of the filler metal.

Figure 8:

After welding, as shown in FIG. 6, the beryllium content of zone (B) drops off at a relatively rapid rate from around 1.8% to about 0.5%, as measured from the outer bead perimeter to the edge of melt and mix zone (B). After the first thermodynamic treatment, the beryllium content remains relatively unchanged. Then, after the second thermodynamic treatment, the weight percent of beryllium decreases gradually from about 1.45% to around 1.05%. This decrease is represented generally in FIG. 6 by a continuation of the first zone line. The metal alloy microstructure, as shown in FIGS. 5 and 8, indicates that solidification of this zone is cellular and occurs relatively quickly.

Figure 9:
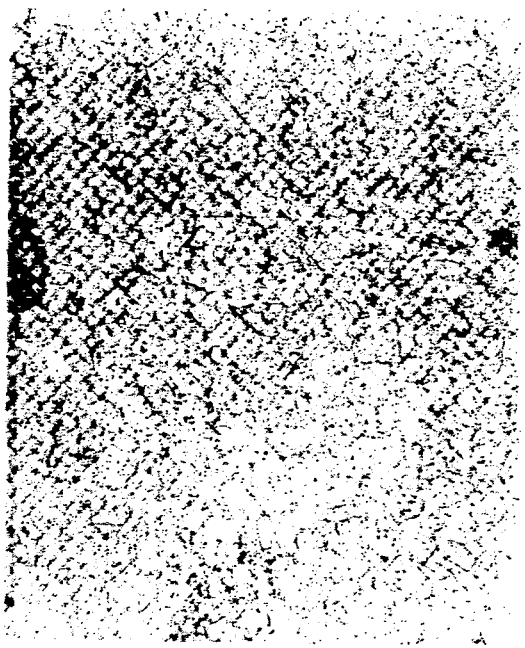

The next zone, further removed from bead center (A), is recrystallized zone (C) which contains generally between 0.6 and 1.0% beryllium. As welded, the beryllium content of this zone drops off exponentially from about 0.6% to around 0.3%, as measured from the outer perimeter of second zone (B) to the edge of recrystallized zone (C), according to FIG. 6. After the first thermodynamic treatment, the beryllium content remains relatively unchanged. After the second thermodynamic treatment, the weight percent of beryllium decreases relatively gradually from about 1.0% to around 0.6%. This decrease is represented by a continuation of the second zone line and has a slope relatively similar to the second zone line. The alloy microstructure, as shown in FIGS. 5 and 9, indicates feather structures as generally understood in the art. While melting is not typically observed in this zone, high temperatures in this region cause grain growth.

Figure 10:

Still further removed from bead center (A) is a fourth or overaged zone (D) containing generally between 0.3 and 0.8% beryllium. After welding, as shown in FIG. 6, the beryllium content of this zone remains relatively constant at around 0.3%, as measured from the outer perimeter of zone (C) to the edge of zone (D). After the first thermodynamic treatment, the beryllium content remains relatively unchanged. After the second thermodynamic treatment, the weight percent of beryllium decreases gradually from about 0.6% to around 0.3%. This decrease is represented by a continuation of the third zone line with a gradually decreasing slope. Like third zone (C), the microstructure of the metal alloy in FIGS. 5 and 10 show feather structures, but with lightened grain structure.

Figure 11:
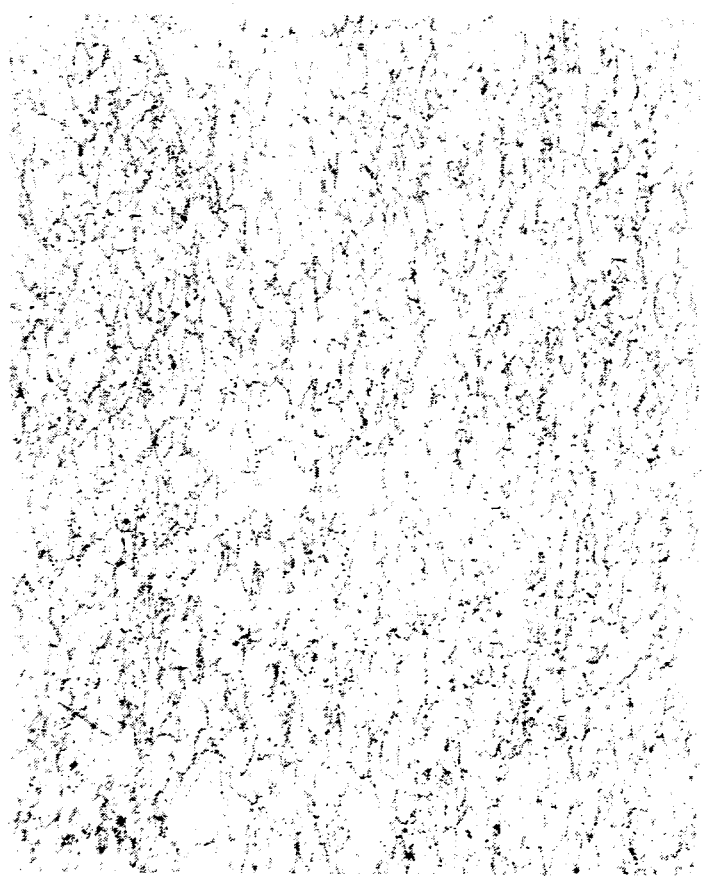

The next zone is base metal zone (E). In the present embodiment, weight percent beryllium in the base metal is relatively constant at around 0.3% throughout welding. After the first and second thermodynamic treatments, the weight percent beryllium remains generally unchanged at about 0.3%. The microstructure of the base metal is shown in FIGS. 5 and 11.

The hardness of the region after first and second thermodynamic treatments varies depending on the material selected, as appreciated by those skilled in the art. For example, hardness of beryllium-copper alloy (Brush Hycon 3 TM), thermodynamically treated in accordance with the present invention, is generally within the range of 185 to 239 DPH.

The present invention combines the use of a filler metal containing a significant amount of strengthening element, with a two phase thermodynamic treatment process which facilitates diffusion of the strengthening agent into the heat affected zone of a region joining two plates. As a result, a strengthening element such as beryllium is available for age hardening in a region that formerly contained beryllium severely overaged by welding heat conditions.

The joining plates are preferably comprised of the same alloy/strengthening agent composition, and the filler material has a relatively higher content of strengthening agent than the plates. In the present embodiment, aged Alloy 25 has greater strength than aged Alloy 3 because its beryllium content is higher.

Figure 12:
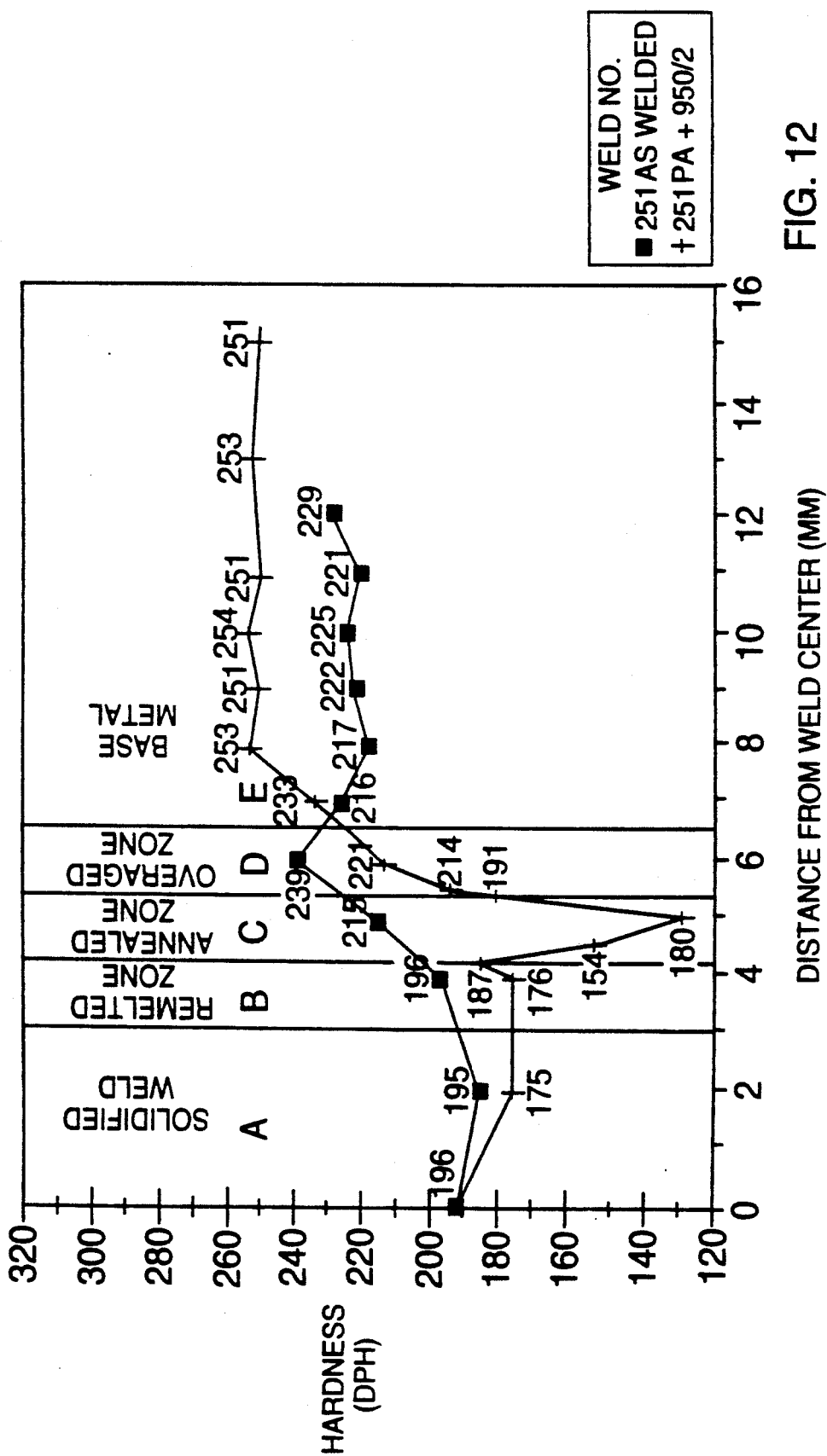
FIG. 12 shows graphs of experimental data for Hardness DPH vs. distance from weld center (mm) for the embodiment illustrated by dotted lines in FIG. 1 before and after first and second thermodynamic treatments.

The present invention has been found advantageous for creating a joining region that is more resistant to corrosion and thermal shock. The region is stronger (harder) and better able to withstand vibration. For example, as illustrated in FIG. 12, the hardness of zones (A)-(E) is increased and relatively uniform after first and second thermodynamic treatments. Fractive toughness is also improved significantly.

Although the embodiments illustrated herein have been described for use with a beryllium-copper alloy material, it is understood that an analogous process could be practiced on other precipitation hardenable materials giving consideration to the purpose for which the present invention is intended. For example, with nickel based alloys, strengthening agents such as aluminum, titanium or beryllium can be diffused into the heat affected zone by a similar process. With steels, filler materials high in carbon can provide a similar advantage. In addition, suitable strengthening agents can be diffused into the heat affected zone for welds comprising silicon and/or aluminum, titanium and magnesium alloys.

Various modifications and alterations to the present invention may be appreciated based on a review of this disclosure. These changes and additions are intended to be within the scope and spirit of this invention as defined by the following claims.

What is claimed is:

1. A process for thermodynamically treating a region joining two members, which comprises:
   (a) heating the region to a first temperature generally within a range of 750° F. and 850° F. so as to diffuse a strengthening material in the region into a heat affected zone between the members;
   (b) maintaining the first temperature for a first selected time so as to raise the percentage of strengthening material diffusing into the heat affected zone;
   (c) heating the region to a second temperature generally within a range of 900° F. to 1000° F. so as to initiate hardening of the heat affected zone;
   (d) maintaining the second temperature for a second selected time so as to harden the heat affected zone with minimal decrease in hardening of the region outside the heat affected zone; and
   (e) cooling the region to room temperature.

2. The process set forth in claim 1 wherein the heat affected zone includes a melt and mix zone.

3. The process set forth in claim 1 wherein the heat affected zone includes a recrystallized zone.

4. The process set forth in claim 1 wherein the heat affected zone includes an overaged zone.

5. The process set forth in claim 1 wherein the first selected time is generally within a range of 3 to 20 hours.

6. The process set forth in claim 1 wherein the first selected time is generally within a range of 0.5 to 5 hours.

7. The process set forth in claim 1 wherein the second selected time is generally within a range of 0.5 to 5 hours.

8. The process set forth in claim 1 wherein the second selected time is generally within a range of 3 to 20 hours.

9. The process set forth in claim 1 wherein the members are a copper alloy including beryllium.

10. The process set forth in claim 1 wherein the region is a copper alloy including beryllium.

* * * * *